United States Patent
Mo et al.

(10) Patent No.: US 10,764,766 B2
(45) Date of Patent: Sep. 1, 2020

(54) METHODS OF RADIO FRONT-END BEAM SWEEPING FOR 5G TERMINALS

(71) Applicant: Samsung Electronics Co., Ltd., Suwon-si, Gyeonggi-do (KR)

(72) Inventors: Jianhua Mo, Garland, TX (US); Prasad P. Netalkar, Ozone Park, NY (US); Boon Loong Ng, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/248,616

(22) Filed: Jan. 15, 2019

(65) Prior Publication Data

US 2019/0306726 A1  Oct. 3, 2019

Related U.S. Application Data

(60) Provisional application No. 62/648,777, filed on Mar. 27, 2018, provisional application No. 62/649,021, (Continued)

(51) Int. Cl.
*H04W 16/28* (2009.01)
*H04W 24/10* (2009.01)
(Continued)

(52) U.S. Cl.
CPC .......... *H04W 16/28* (2013.01); *H04B 7/0617* (2013.01); *H04W 24/10* (2013.01); *H04B 7/0456* (2013.01); *H04B 7/0695* (2013.01)

(58) Field of Classification Search
CPC .... H04W 16/28; H04W 24/10; H04B 7/0617; H04B 7/0695; H04B 7/0456; H04B 7/0404
See application file for complete search history.

(56) References Cited

U.S. PATENT DOCUMENTS 6,233,466 B1 * 5/2001 Wong ..................... H01Q 1/246
370/342
10,098,091 B2  10/2018 Seol et al.
(Continued)

FOREIGN PATENT DOCUMENTS

KR  10-2013-0084340 A  7/2013
WO  2017184190 A1  10/2017
WO  2017/196612 A1  11/2017

OTHER PUBLICATIONS

Igor Moaco Guerreiro, "Distributed Optimization Techniques for 4G and Beyond", Jun. 30, 2016, 135 pages.
(Continued)

*Primary Examiner* — Vinncelas Louis

(57) ABSTRACT

A method of a user equipment (UE) in a wireless communication system includes identifying a radiation pattern of each beam in a set of beams to be used for communicating with a base station (BS), identifying a database including a beam index of each beam in the set of beams, identifying a beam sweeping sequence based on at least one of the database, the radiation pattern of each beam, or a UE-specific condition, and sweeping each beam in the set of beams based on the beam sweeping sequence to radiate signal power of each beam through a transceiver.

20 Claims, 18 Drawing Sheets

Related U.S. Application Data filed on Mar. 28, 2018, provisional application No. 62/742,015, filed on Oct. 5, 2018.

(51) Int. Cl.
*H04B 7/06* (2006.01)
*H04B 7/0456* (2017.01)

(56) References Cited

U.S. PATENT DOCUMENTS

2017/0215117 A1    7/2017  Kwon et al.
2019/0174346 A1*  6/2019  Murray ............... H04W 72/046

OTHER PUBLICATIONS

CATT, "Further details on NR 4-step RA Procedure", 3GPP TSG RAN WG1 Meeting #90bis, Oct. 9-13, 2017, 20 pages, R1-1717803.
International Search Report dated Jul. 4, 2019 in connection with International Patent Application No. PCT/KR2019/003603, 3 pages.
Written Opinion of the International Searching Authority dated Jul. 4, 2019 in connection with International Patent Application No. PCT/KR2019/003603, 5 pages.

* cited by examiner

METHODS OF RADIO FRONT-END BEAM SWEEPING FOR 5G TERMINALS

CROSS-REFERENCE TO RELATED APPLICATION(S) AND CLAIM OF PRIORITY

The present application claims priority to:
U.S. Provisional Patent Application Ser. No. 62/648,777, filed on Mar. 27, 2018;
U.S. Provisional Patent Application Ser. No. 62/649,021, filed on Mar. 28, 2018; and
U.S. Provisional Patent Application Ser. No. 62/742,015, filed on Oct. 5, 2018.
The content of the above-identified patent documents are incorporated herein by reference.

TECHNICAL FIELD

The present application relates generally to beam management. More specifically, this disclosure relates to radio front-end beam management for an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide beam codebook generation for an advanced communication system.

In one embodiment, a user equipment (UE) in a wireless communication system is provided. The UE comprises at least one processor configured to identify a radiation pattern of each beam in a set of beams to be used for communicating with a base station (BS), identify a database including a beam index of each beam in the set of beams, identify a beam sweeping sequence based on at least one of the database, the radiation pattern of each beam, or a UE-specific condition, and sweep each beam in the set of beams based on the beam sweeping sequence to radiate signal power of each beam through a transceiver that is operably connected to the at least one processor.

In another embodiment, a method of a user equipment (UE) in a wireless communication system is provides. The method comprises identifying a radiation pattern of each beam in a set of beams to be used for communicating with a base station (BS), identifying a database including a beam index of each beam in the set of beams, identifying a beam sweeping sequence based on at least one of the database, the radiation pattern of each beam, or a UE-specific condition, and sweeping each beam in the set of beams based on the beam sweeping sequence to radiate signal power of each beam through a transceiver.

In yet another embodiment, a non-transitory computer readable medium comprising instructions, that when executed by at least one processor of a user equipment (UE), is provided. The non-transitory computer readable medium comprising instruction causes the UE to identify a radiation pattern of each beam in a set of beams to be used for communicating with a base station (BS), identify a database including a beam index of each beam in the set of beams, identify a beam sweeping sequence based on at least one of the database, the radiation pattern of each beam, or a UE-specific condition; and sweep each beam in the set of beams based on the beam sweeping sequence to radiate signal power of each beam through a transceiver.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
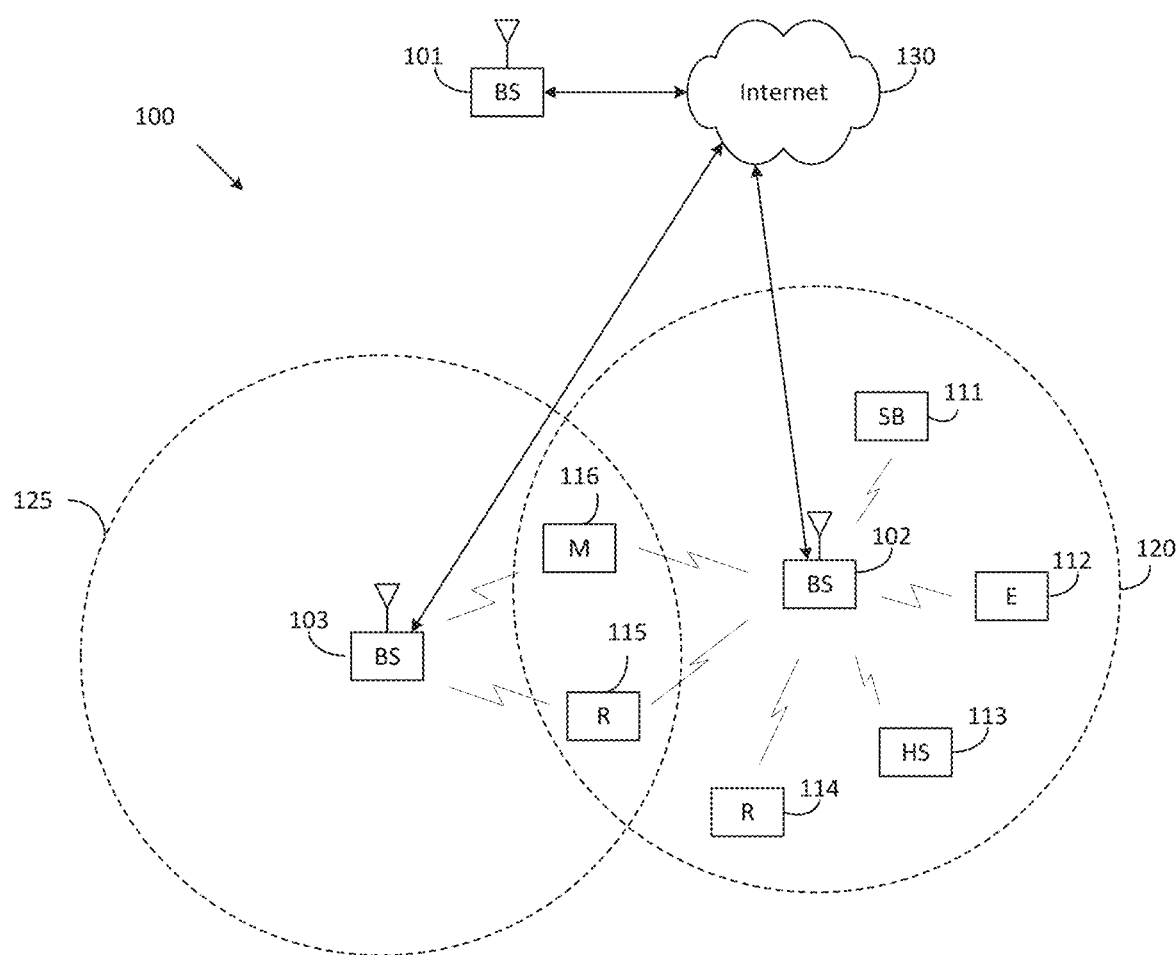
FIG. 1 illustrates an example wireless network according to embodiments of the present disclosure.
Figure 2:
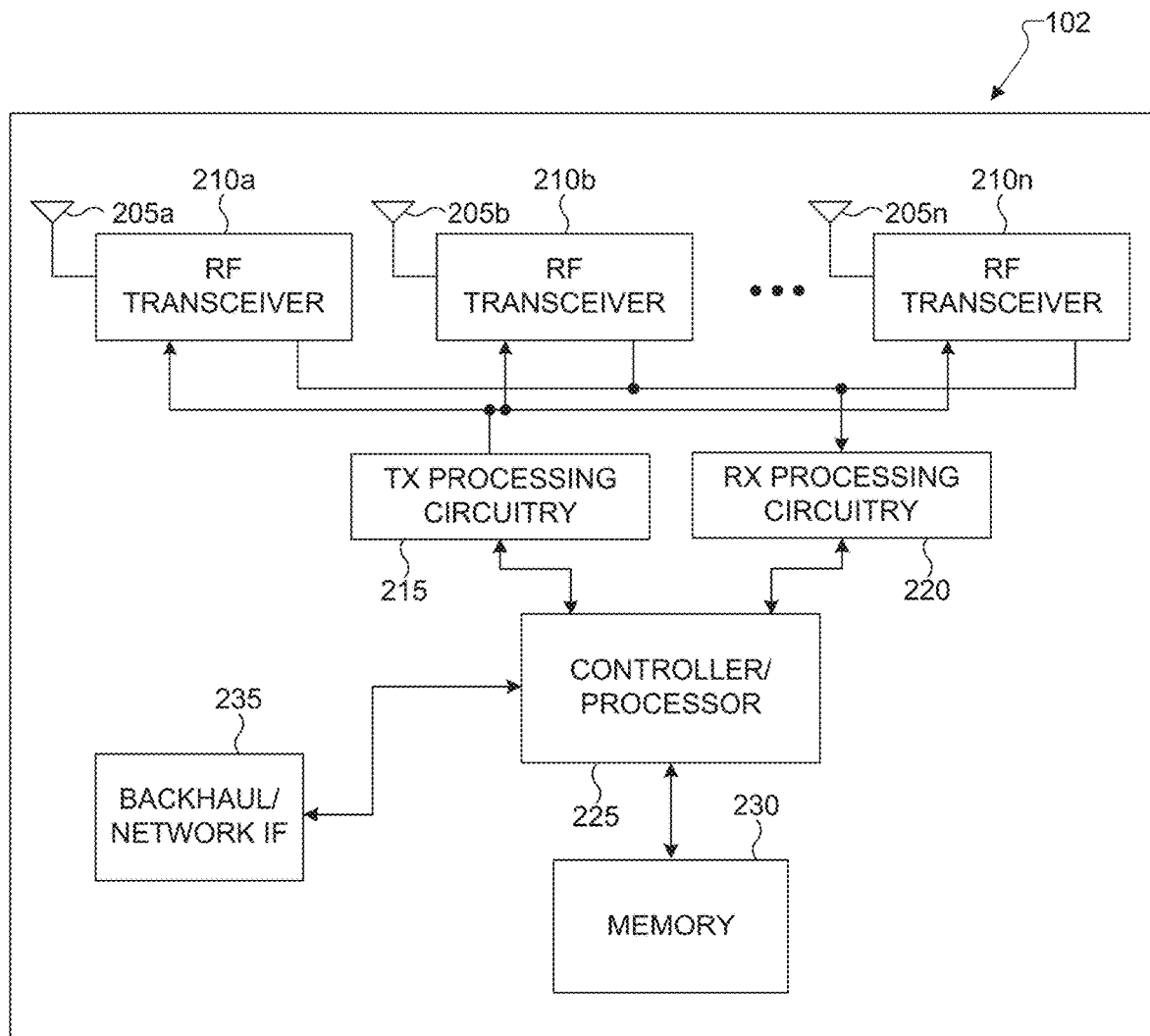
FIG. 2 illustrates an example gNB according to embodiments of the present disclosure.
Figure 3:
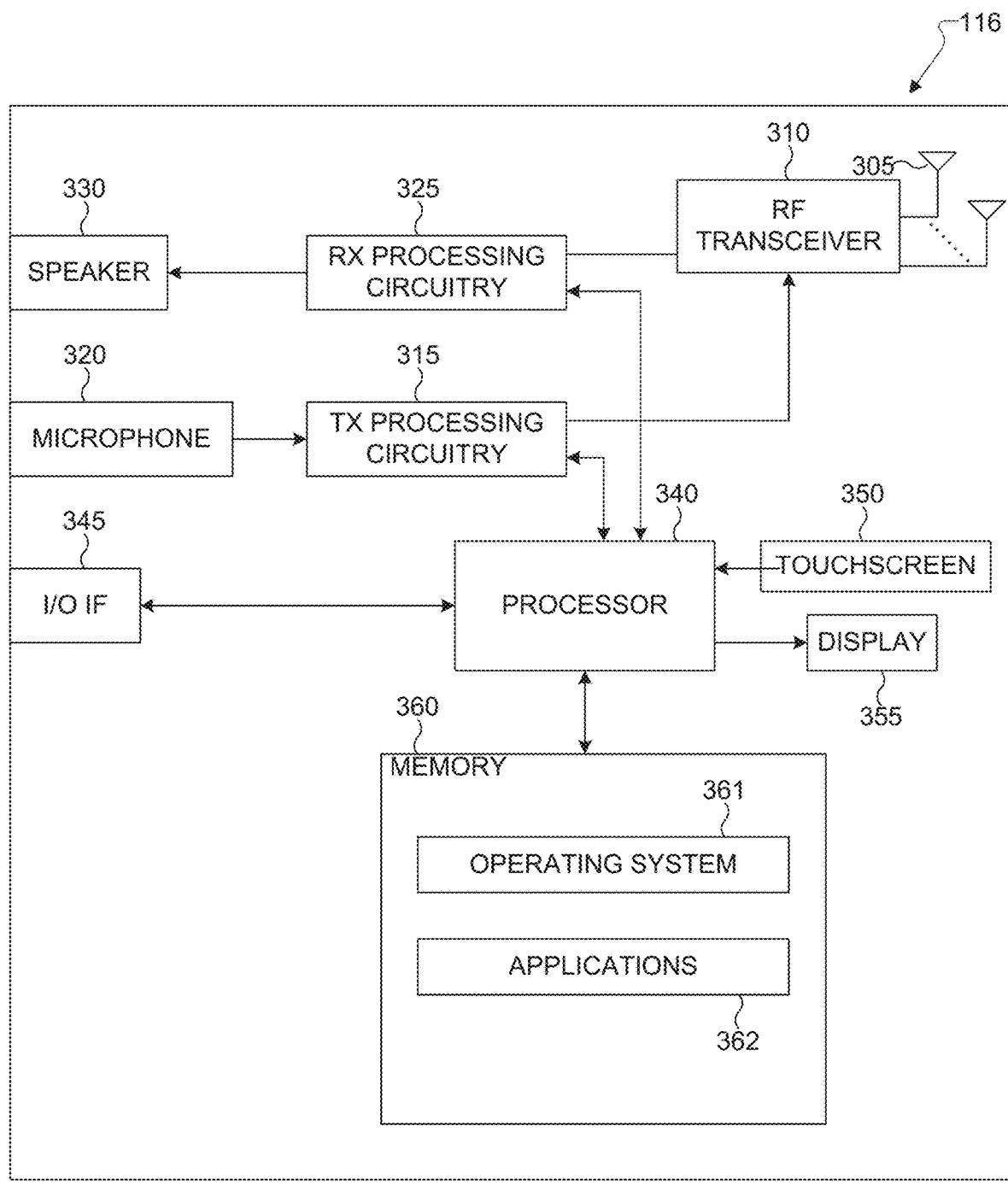
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient radio front-end beam sweeping for 5G terminal. In certain embodiments, and one or more of the gNBs 101-103 includes circuitry, programing, or a combination thereof, for efficient radio front-end beam sweeping for 5G terminal.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
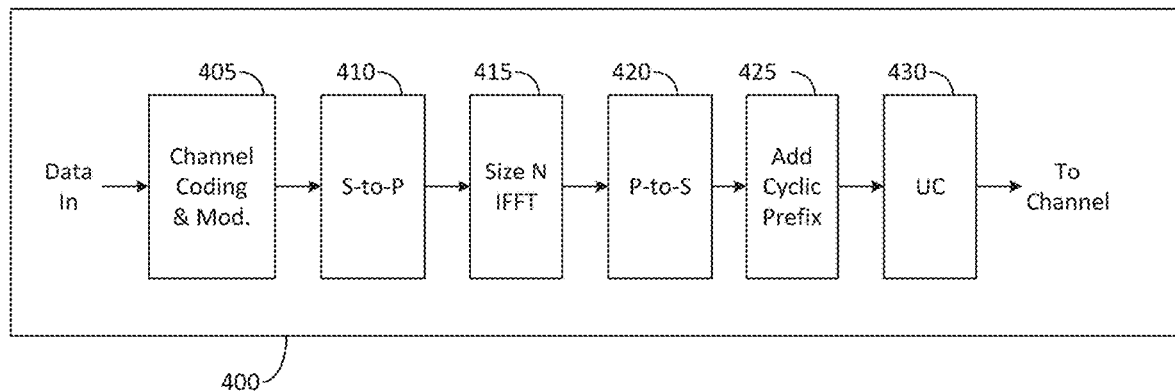
FIG. 4A illustrates a high-level diagram of an orthogonal frequency division multiple access transmit path according to embodiments of the present disclosure.
Figure 4B:
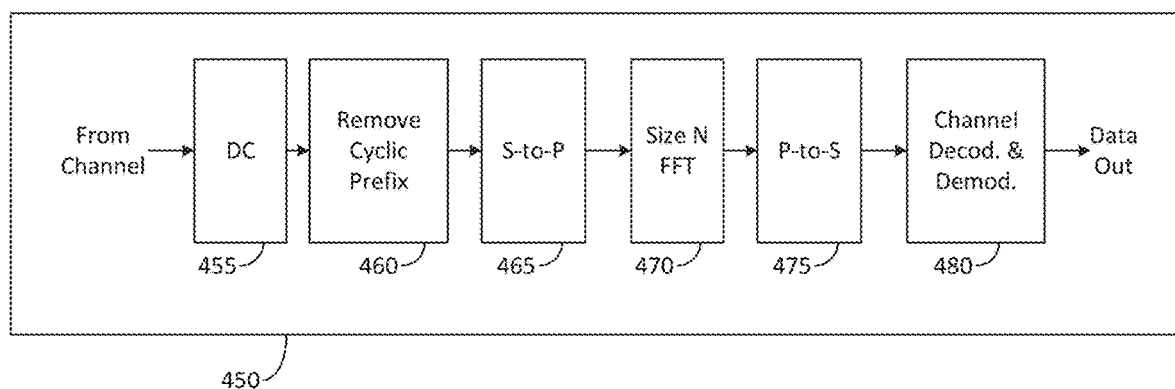
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB. For 5G systems, a base station (e.g., eNB) is often referred as a gNB. The present disclosure does not limit a usage of an eNB or a gNB in a type of wireless communication systems.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
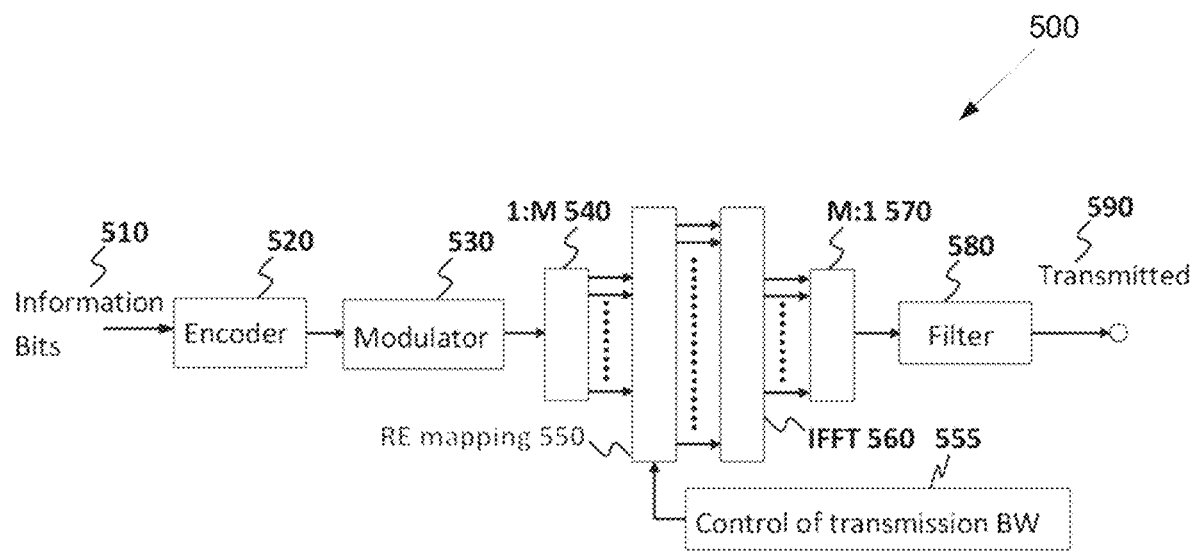
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a channel encoder (e.g., turbo encoder) for LTE and/or LDPC encoder for NR, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
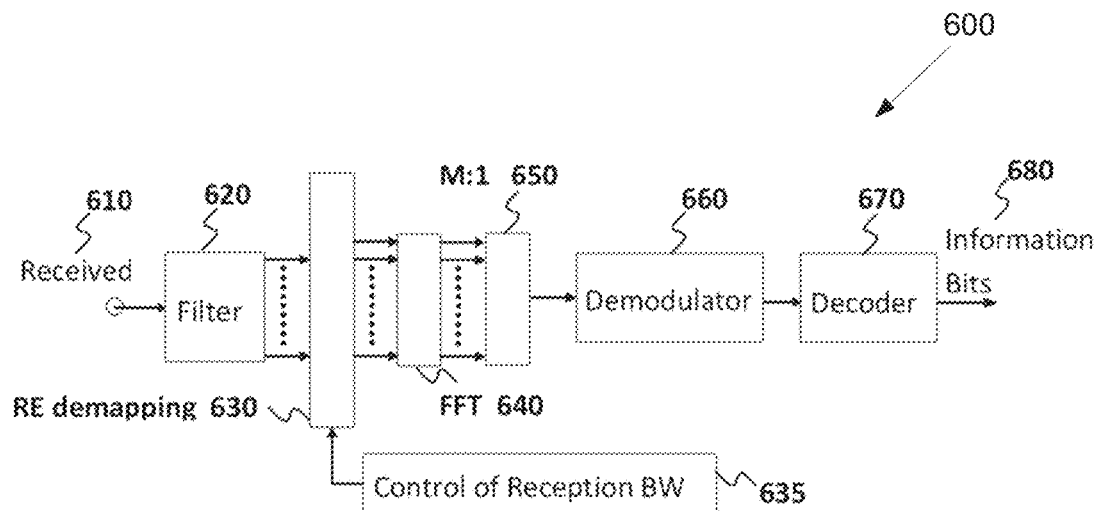
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
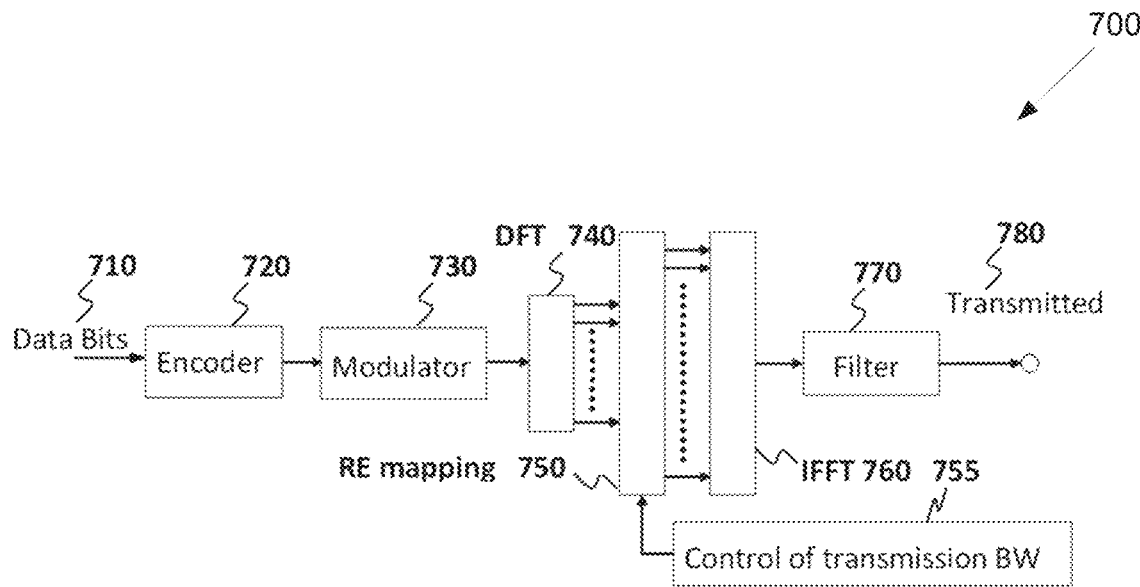
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
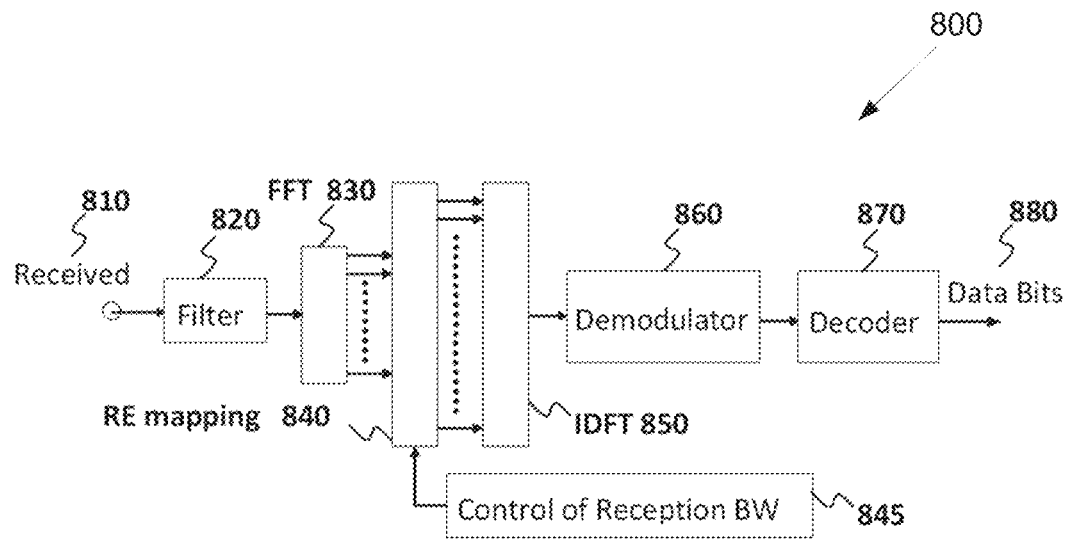
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a channel decoder (e.g., turbo decoder) for LTE and/or LDPC decoder for NR, decodes the demodulated data to provide an estimate of the information data bits 880.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
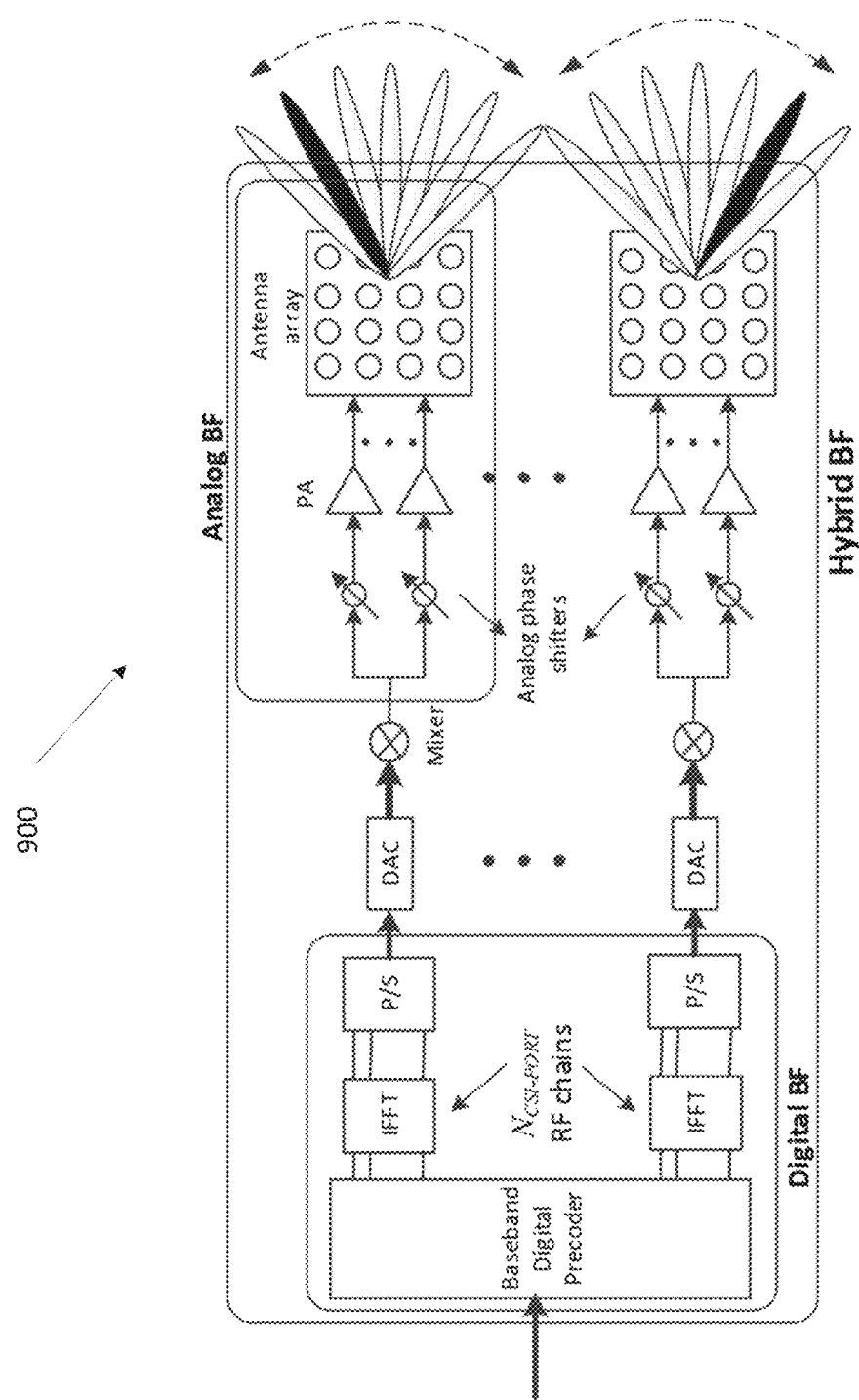
FIG. 9 illustrates an example multiplexing of two slices according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

Figure 10:
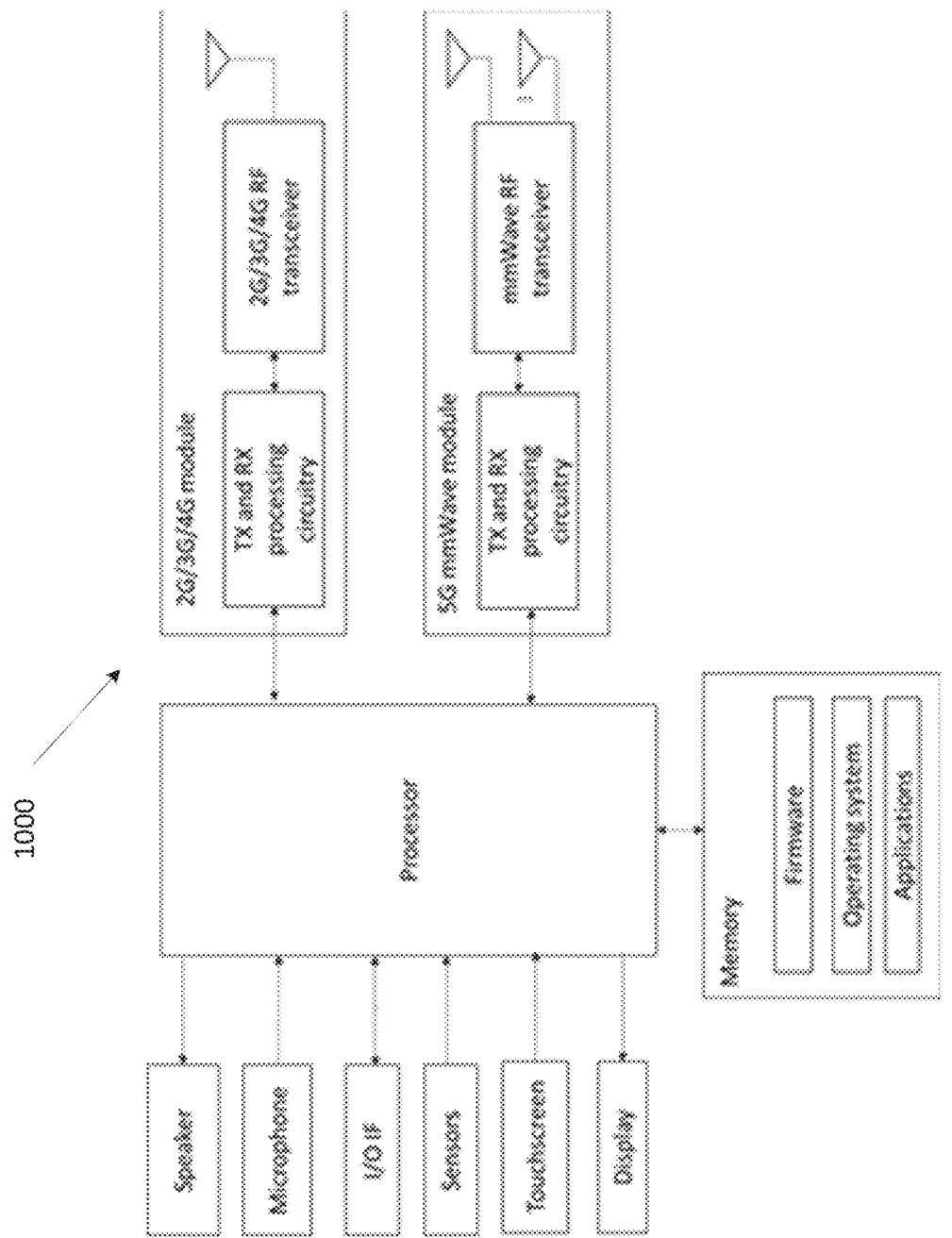
FIG. 10 illustrates an example user equipment according to embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

In LTE, a number of CSI reporting modes exist for both periodic (PUCCH-based) and aperiodic (PUSCH-based) CSI reporting. Each CSI reporting mode is depend on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

To assist the UE in determining RX and/or TX beam of the UE, a beam sweeping procedure is employed consisting of the gNB transmitting a set of transmit beams to sweep the cell area and the UE measuring the signal quality on different beams using the UE's receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of Tx beams for reception of PDCCH and/or PDSCH.

FIG. 10 illustrates an example user equipment 1000 according to embodiments of the present disclosure. The embodiment of the user equipment 1000 illustrated in FIG. 10 is for illustration only. FIG. 10 does not limit the scope of this disclosure to any particular implementation.

As shown in FIG. 10, the UE includes a 2G/3G/4G communication module and a 5G mmWave communication module. Each communication module includes one or more antennas, one radio frequency (RF) transceiver, transmit (TX) and receive (RX) processing circuitry. The UE also includes a speaker, a processor, an input/output (I/O) interface (IF), one or more sensors (touch sensor(s), proximity sensor(s), gyroscope, etc.), a touchscreen, a display, and a memory. The memory includes a firmware, an operating system (OS), and one or more applications.

The RF transceiver receives, from the antenna, an incoming RF signal transmitted by an eNB/gNB of the network. The RF transceiver down-converts the incoming RF signal to generate an intermediate frequency (IF) or baseband signal. The IF or baseband signal is sent to the RX processing circuitry, which generates a processed baseband signal by filtering, decoding, and/or digitizing the baseband or IF signal. The RX processing circuitry transmits the processed baseband signal to the processor for further processing (such as for voice or web browsing data).

The TX processing circuitry receives outgoing baseband data (such as voice, web data, e-mail, or interactive video game data) from the processor. The TX processing circuitry encodes, multiplexes, and/or digitizes the outgoing baseband data to generate a processed baseband or IF signal. The RF transceiver receives the outgoing processed baseband or IF signal from the TX processing circuitry and up-converts the baseband or IF signal to an RF signal that is transmitted via the antenna The processor can include one or more processors and execute the basic OS program stored in the memory in order to control the overall operation of the UE. In one such operation, the main processor controls the reception of forward channel signals and the transmission of reverse channel signals by the RF transceiver, the RX processing circuitry, and the TX processing circuitry in accordance with well-known principles. The main processor can also include processing circuitry configured to allocate one or more resources.

For example, the processor can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. downlink control information (DCI) serves several purposes and is conveyed through DCI formats in respective PDCCHs. For example, a DCI format may correspond to a downlink assignment for PDSCH receptions or to an uplink grant for PUSCH transmissions. In some embodiments, the processor includes at least one microprocessor or microcontroller.

The processor is also capable of executing other processes and programs resident in the memory, such as operations for inter-eNB/gNB coordination schemes to support inter-eNB/gNB carrier aggregation. It should be understood that inter-eNB/gNB carrier aggregation can also be referred to as dual connectivity. The processor can move data into or out of the memory as required by an executing process. In some embodiments, the processor is configured to execute a plurality of applications, such as applications for MU-MIMO communications, including obtaining control channel elements of PDCCHs.

The processor can operate the plurality of applications based on the OS program or in response to a signal received from an eNB/gNB. The main processor is also coupled to the I/O interface, which provides UE with the ability to connect to other devices such as laptop computers and handheld computers. The I/O interface is the communication path between these accessories and the main controller.

The processor is also coupled to the touchscreen and the display. The operator of the UE can use the touchscreen to enter data into the UE. The display may be a liquid crystal display, light emitting diode display, or other display capable of rendering text and/or at least limited graphics, such as from web sites.

The memory is coupled to the processor. Part of the memory could include a random access memory (RAM), and another part of the memory could include a Flash memory or other read-only memory (ROM).

Although FIG. 10 illustrates one example of UE, various changes may be made to FIG. 10. For example, various components in FIG. 10 could be combined, further subdivided, or omitted and additional components could be added according to particular needs. As a particular example, the processor could be divided into multiple processors, such as one or more central processing units (CPUs) and one or more graphics processing units (GPUs). Also, while FIG. 10 illustrates the UE configured as a mobile telephone or smartphone, UEs could be configured to operate as other types of mobile or stationary devices.

A 5G terminal or a UE can be equipped with multiple antenna elements. Beamforming is an important factor when the UE tries to establish a connection with a BS station. To compensate for the narrower analog beamwidth in mmWave, analog beams sweeping can be employed to enable wider signal reception or transmission coverage for the UE.

A beam codebook comprises a set of codewords, where a codeword may be a set of analog phase shift values, or a set of amplitude plus phase shift values, applied to the antenna elements, in order to form an analog beam. Give a set of beam codebook, the beams can be swept one by one, for example, from left to right in the horizontal domain, from top to down in the elevational domain.

There are several issues with this simple approach. First, not all the beams are equal in gain and shape. Some of the beams may have larger gain in a small sphere region while some other has lower gain but a wider beamwidth. For instance, the beams pointing to the boresight direction often have the highest gain but narrowest beamwidth while the beams pointing to an end fire region have the largest beamwidth and lowest gain. This observation should be taken into account when designing a beam sweeping procedure with minimized latency.

Second, wireless signal may come from certain direction(s) more often than the other directions. Therefore, the beams corresponding to directions with higher probability of occurrence may be selected with higher probability than others.

Third, the beam sweeping is time-consuming when the codebook size is large. We may limit the number of swept beams and/or stop beam sweeping once a sufficiently good beam is found which is beneficial in delay-sensitive cases, for example, the vehicle-to-vehicle communication.

In one embodiment, a UE is equipped with a unit which determines the beam sweeping sequence for the UE based on one or more of the inputs, including: beam codebook or equivalently the beam patterns corresponding the beam codebook; target performance metric for beam sweeping; and a UE-specific condition, such as the UE orientation, and/or channel environment.

Figure 11:
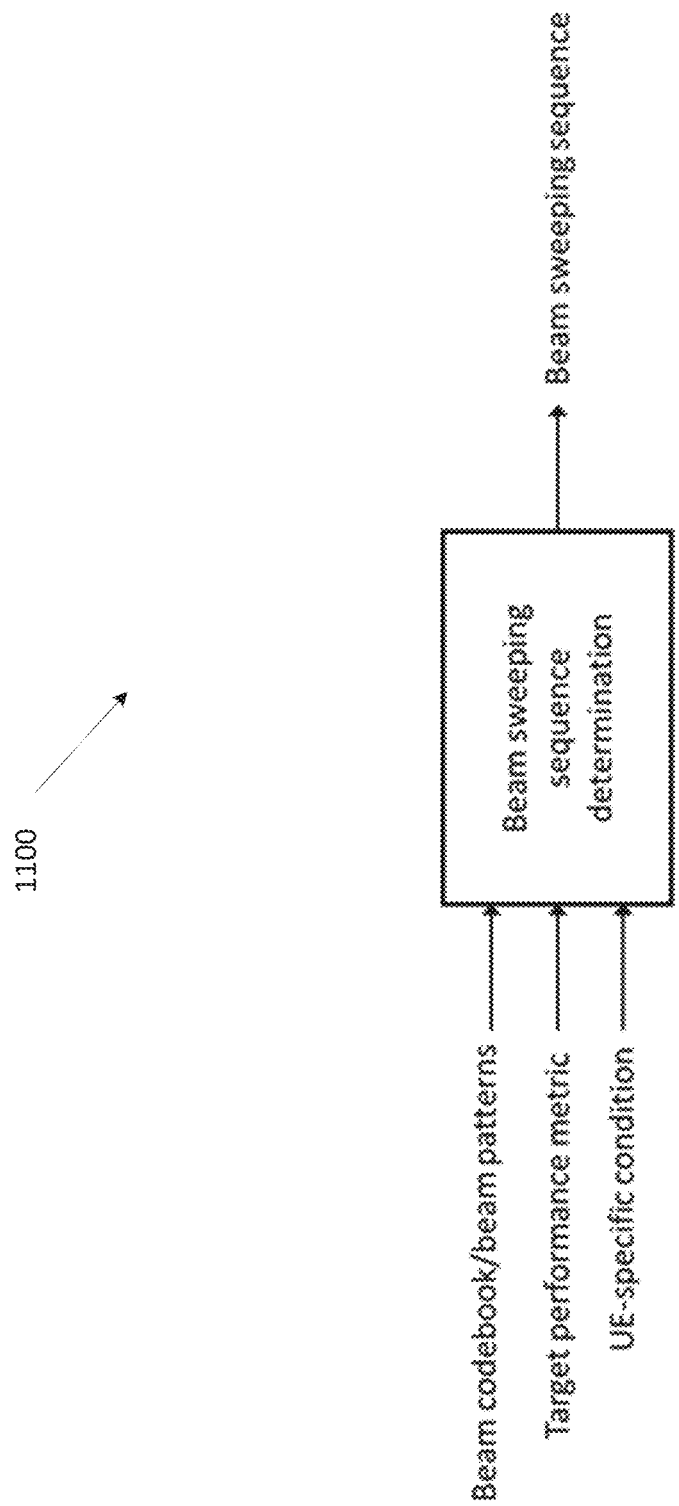
FIG. 11 illustrates an example beam sweeping determination unit (BSDU) according to embodiments of the present disclosure.

FIG. 11 illustrates an example beam sweeping determination unit 1100 according to embodiments of the present disclosure. The embodiment of the user equipment 1100 illustrated in FIG. 11 is for illustration only. FIG. 11 does not limit the scope of this disclosure to any particular implementation.

As illustrated in FIG. 11, the beam sweeping determination unit (BSDU) also enables the UE to update the best beam sweeping sequence if there is a change to the inputs. If some of the inputs above are deterministic (not changing over time) e.g. the beam codebook or the target performance metric, then can be built in the unit and need not be an input to the unit. The UE-specific condition as an input is optional and need not be applied if dependency on UE-specific condition is not desired to reduce implementation complexity.

In one embodiment, the beam sweeping sequence is optimized to improve the system performance, for example, accelerate the beam-alignment process. The beam sweeping sequence is determined by the inputs including the beam pattern, a UE-specific condition and the target performance metric.

In one example, the sweeping sequence is determined by the area of dominating region, which is the angular domain region that a beam has higher beam gain than all the other beams. For example, the beam is swept in the decreasing order of the dominating area, i.e. the beam with the largest dominating area may be swept first, followed by the beam with second largest dominating area and so on.

In another example, a greedy algorithm is used to decide the sweeping sequence with certain criteria, for example, the median equivalent isotropically radiated power (EIRP), the mean EIRP, EIRP at a given or multiple percentile points (e.g., 20%-tile, 50%, 80%-tile). The metric could be defined in the whole sphere or given angular region, for example, the half sphere on the boresight of the antenna.

In yet another example, the first sweep the beams with larger step size e.g. in angular domain, then perform refinement with narrower step size.

Figure 12:
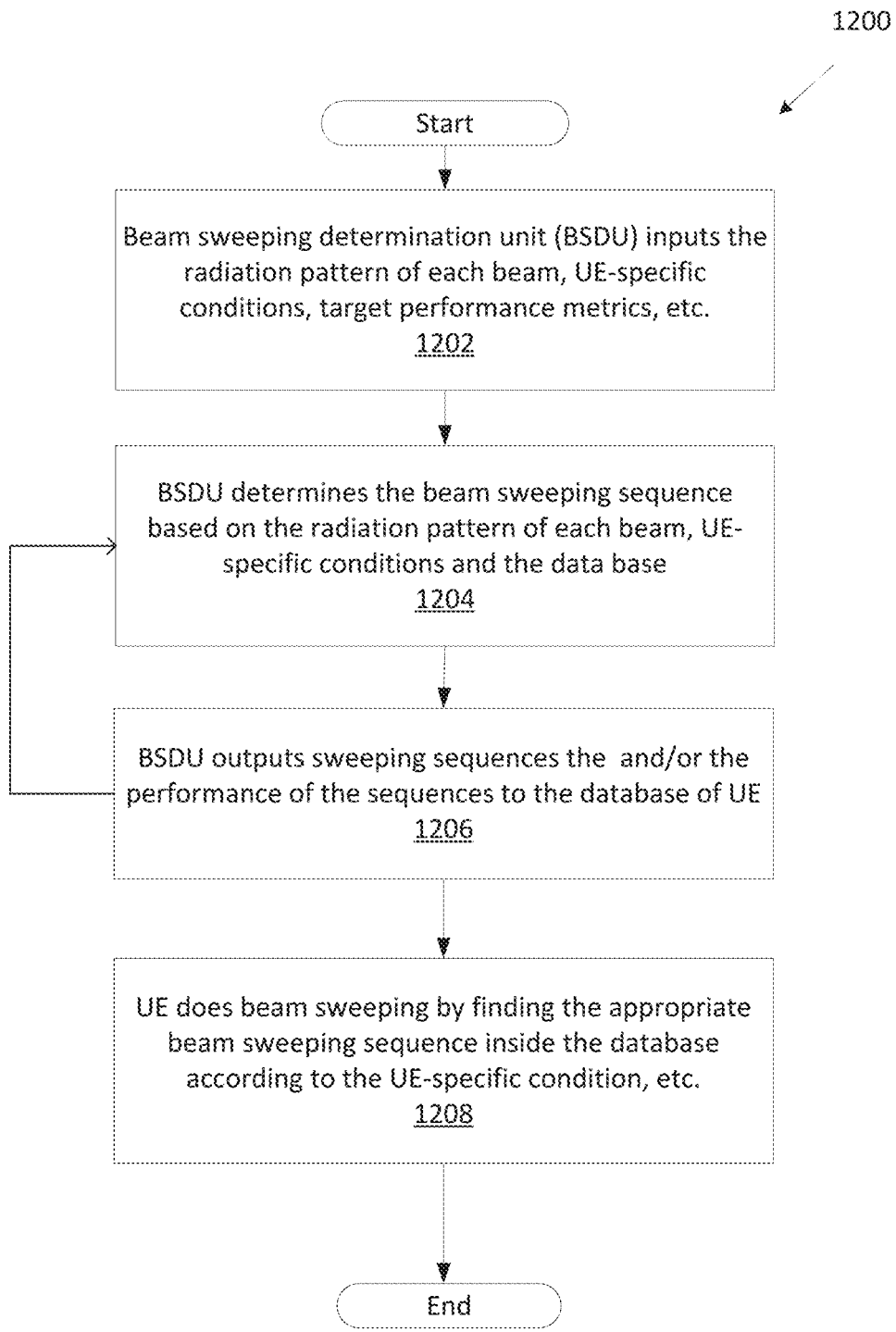
FIG. 12 illustrates a flow chart of a method for beam sweeping sequence according to embodiments of the present disclosure.

The input of the algorithm may include the radiation pattern of all the beams and the UE-specific condition (if applicable). The output may include one or multiple optimized sweeping sequences, and/or the performance of the sweeping sequences. The multiple sequences may be generated by different schemes, or the same scheme but different metrics. The length of the multiple sequences may also have different. The output may also include the performance of the metric, for example, the total sweeping time, the mean gain. FIG. 12 illustrated the algorithm.

FIG. 12 illustrates a flow chart of a method 1200 for beam sweeping sequence according to embodiments of the present disclosure. The embodiment of the method 1200 illustrated in FIG. 12 is for illustration only. FIG. 12 does not limit the scope of this disclosure to any particular implementation.

As illustrated in FIG. 12, the method 1200 begins at step 1202. In step 1202, a beam sweeping determination unit (BSDU) inputs the radiation pattern of each beam, UE-specific conditions, target performance metrics, etc. In step, 1204, the BSDU determines the beam sweeping sequence based on the radiation pattern of each beam, UE-specific conditions and the data base. In step 1206, the BSDU outputs sweeping sequences and/or the performance of the sequences to the database of UE.

The radiation pattern may be obtained from real-world measurement or from simulations, for example, HFSS or MATLAB. Throughout the present disclosure, a codebook containing 16 beams applied on a two-by-two antenna array will be used as an example to illustrate the schemes.

Figure 13:
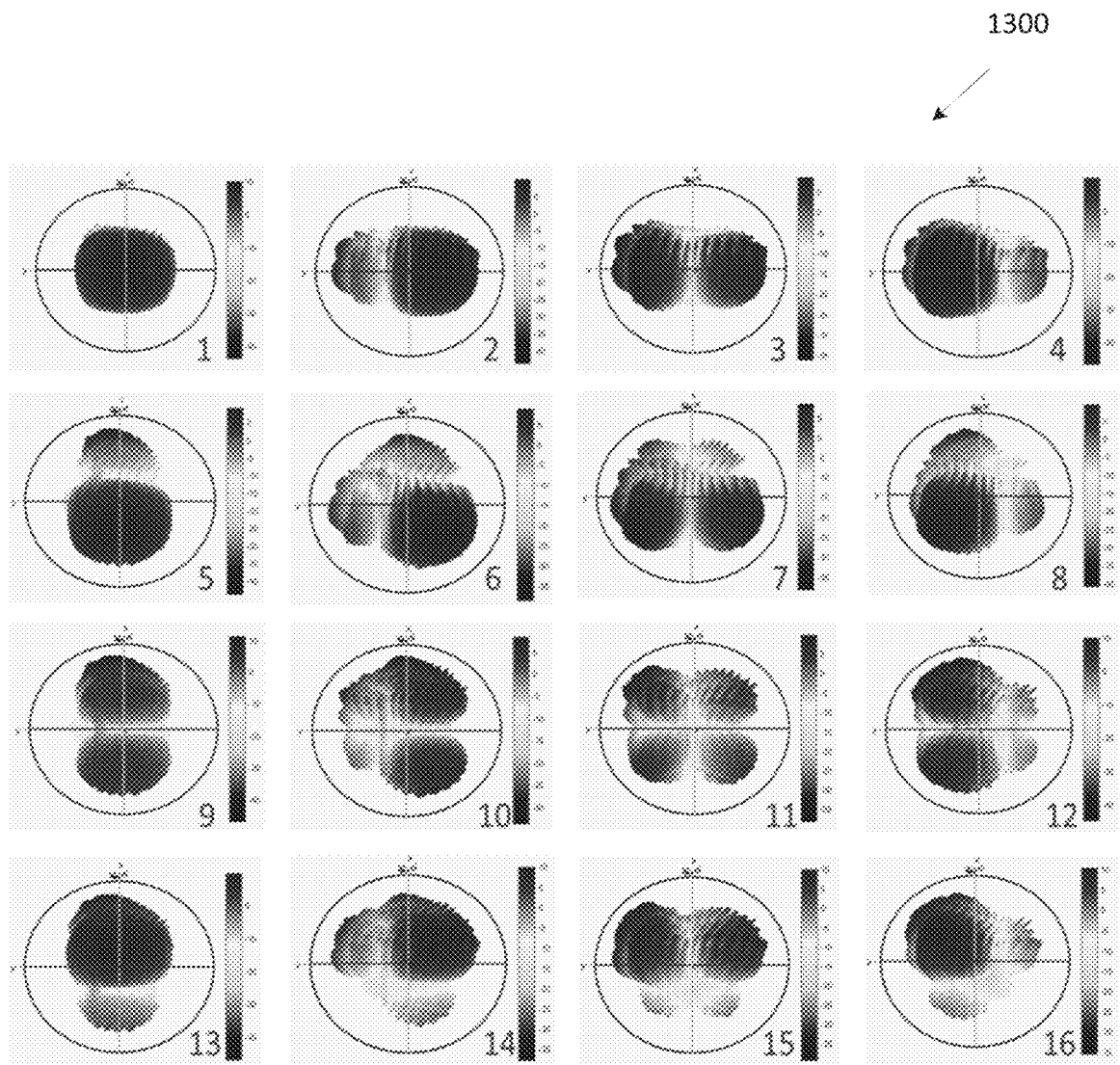
FIG. 13 illustrates an example 3-D radiation pattern of 16 beams according to embodiments of the present disclosure.

FIG. 13 illustrates an example 3-D radiation pattern of 16 beams 1300 according to embodiments of the present disclosure. The embodiment of the 3-D radiation pattern of 16 beams 1300 illustrated in FIG. 13 is for illustration only. FIG. 13 does not limit the scope of this disclosure to any particular implementation.

FIG. 13 shows an example of the radiation patterns of the 16 beams, where each beam is labelled with an index (1 . . . 16).

Figure 14:
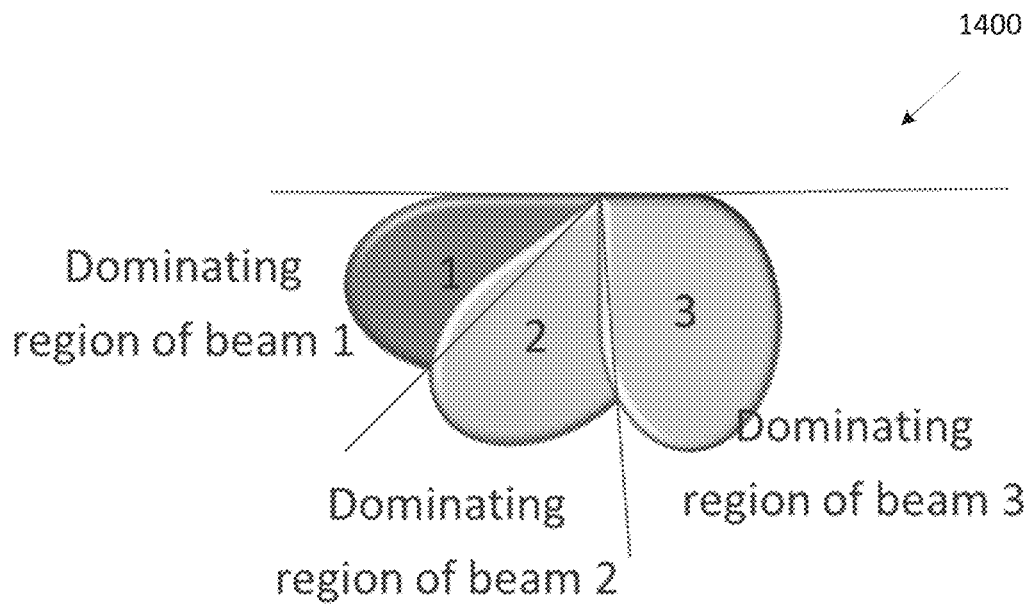
FIG. 14 illustrates an example 2-D showing the dominating regions of 3 beams according to embodiments of the present disclosure.

In one embodiment based on the area of dominating region, the dominating region of a beam is defined as the region that the beam has the highest gain compared to all the other beams. FIG. 14 illustrates the dominating regions of three beams.

FIG. 14 illustrates an example 2-D showing the dominating regions of 3 beams 1400 according to embodiments of the present disclosure. The embodiment of the 2-D showing the dominating regions of 3 beams 1400 illustrated in FIG. 14 is for illustration only. FIG. 14 does not limit the scope of this disclosure to any particular implementation.

To reduce the latency of the beam-alignment process, the UE may first employ the beam with the largest dominating area. To measure the size of the dominating region, points uniformly distributed on the unit sphere is first generated.

Figure 15:
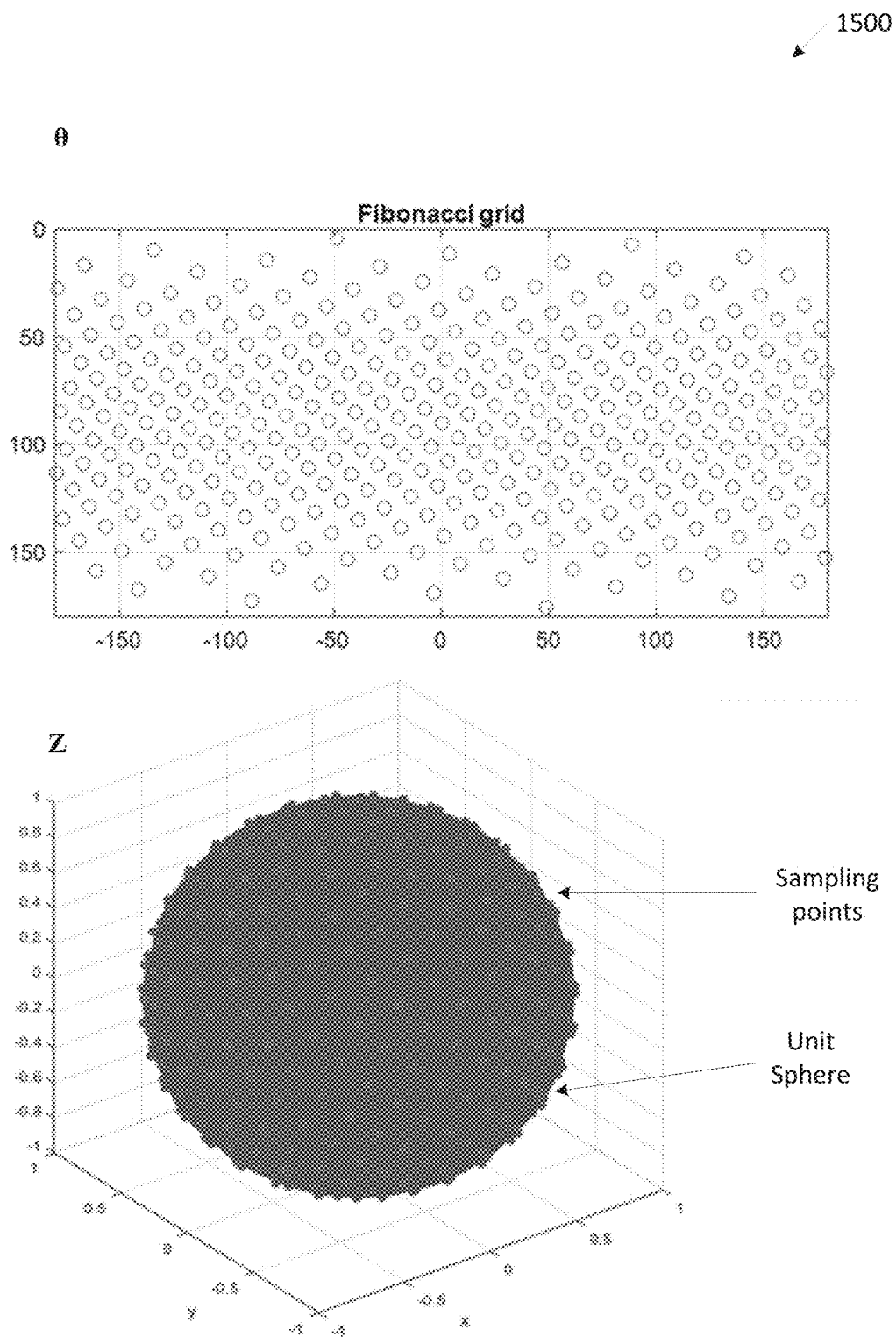
FIG. 15 illustrates an example Fibonacci grid with 363 points on the whole sphere according to embodiments of the present disclosure.

Each point corresponds to a direction, which is pointing from the origin to the point on the sphere. The gains of beams on these directions and record may be evaluated the dominating beam on each direction. The sweeping sequence is then determined by the number of directions that each beam dominates. FIG. 15 is an example of 363 points on the Fibonacci grid.

FIG. 15 illustrates an example fibonacci grid with 363 points 1500 on the whole sphere according to embodiments of the present disclosure. The embodiment of the fibonacci grid with 363 points 1500 illustrated in FIG. 15 is for illustration only. FIG. 15 does not limit the scope of this disclosure to any particular implementation.

Figure 16:
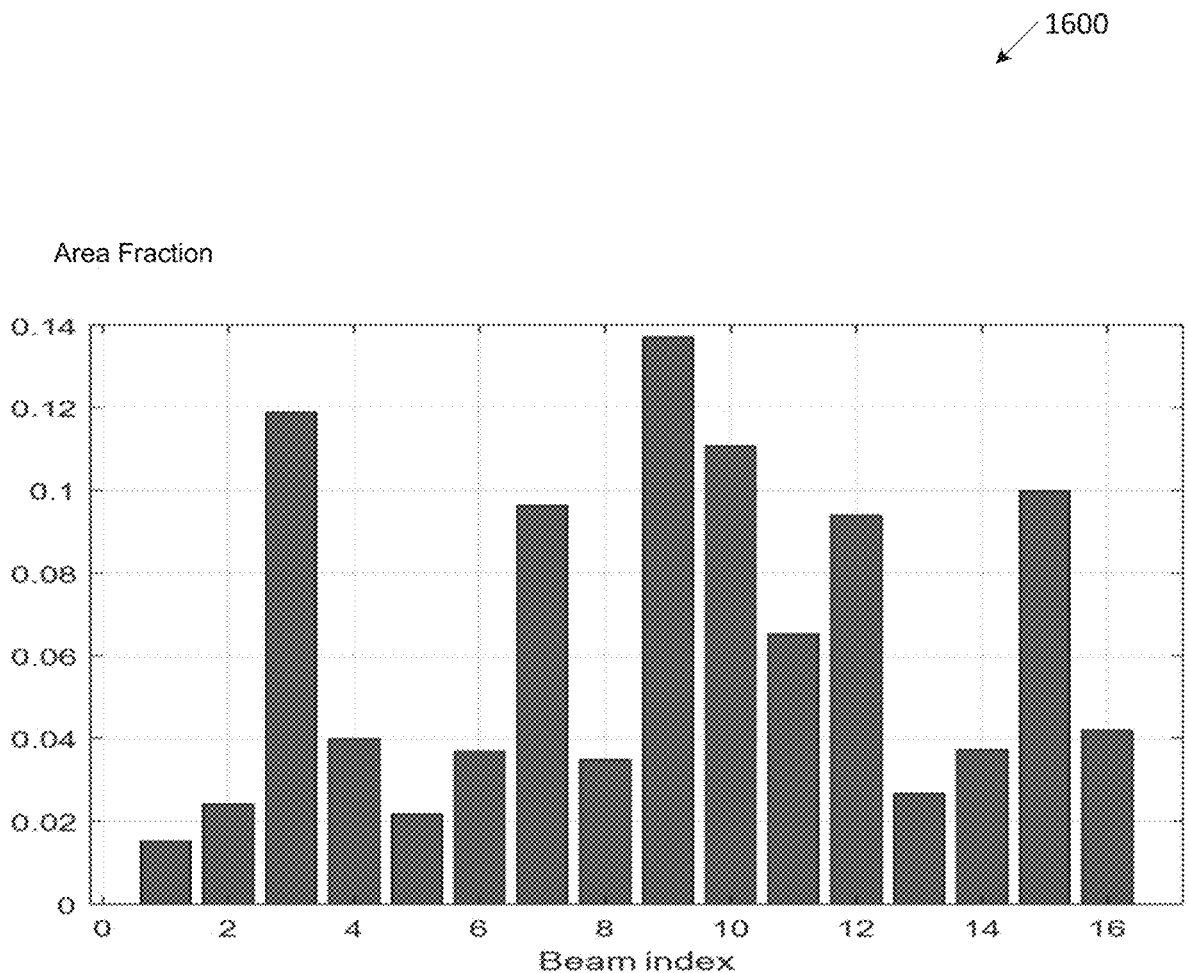
FIG. 16 illustrates an example fraction of whole sphere covered by each beam according to embodiments of the present disclosure.

FIG. 16 illustrates an example fraction of whole sphere 1600 covered by each beam according to embodiments of the present disclosure. The embodiment of the fraction of whole sphere 1600 illustrated in FIG. 16 is for illustration only. FIG. 16 does not limit the scope of this disclosure to any particular implementation.

FIG. 16 shows a plot of the fraction of the area that each beam dominates. It can be observed that the fraction is not equal across the beams, in particular for this example, beam 9 is the beam with the largest dominating region. By sorting according to the area fraction metric, the sweeping sequence is determined to be 9, 3, 10, 15, 7, 12, 11, 16, 4, 14, 6, 8, 13, 2, 5, and 1.

In one embodiment, a greedy algorithm is provided. In such embodiment, the beam is selected one-by-one based on a certain criterion. For example, the beam with the largest mean EIRP across the sphere is selected first. Then the second beam is selected to maximize the mean composite EIRP. This procedure is repeated until all the beams have been selected. The flowchart of this method is shown in FIG. 17.

Figure 17:
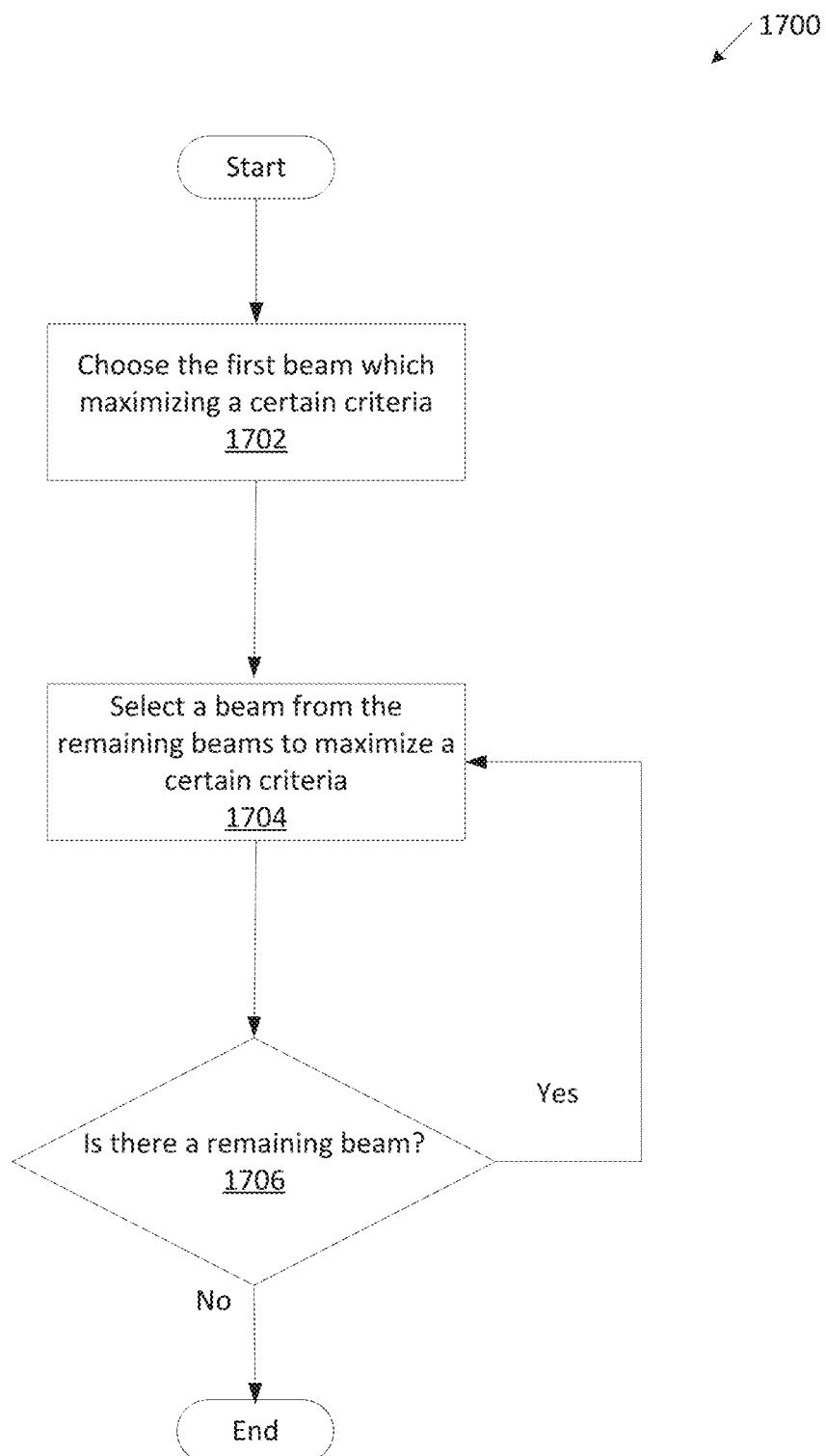
FIG. 17 illustrates a flow chart of a method for a greedy algorithm according to embodiments of the present disclosure.

FIG. 17 illustrates a flow chart of a method 1700 for a greedy algorithm according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins in step 1702. In step 1702, the method 1700 choose the first beam which maximizing a certain criteria. In step 1704, the method selects a beam from the remaining beams to maximize a certain criteria. In step 1706, the method 1700 to determine whether there is a remaining beam. In step 1706, if the method 1700 determines that there is a remaining beam, the method performs step 1704.

The possible selection criteria include but not limited to. In one example, the selection criteria include the EIRP value on the whole sphere (or a given angular region, for example, only a half sphere). In such example, metrics include but not limited to: the mean EIRP; single x percentile EIRP (x can be 20, 50, 80, etc.); multiple percentile EIRP (for example, 20%-tile EIRP being larger than $Y_1$ dB and 50%-tile EIRP being larger than $Y_2$ dB); and combination of the above metrics, for example, the mean EIRP being larger than $Z_1$ dB and the 20%-tile EIRP larger than $Z_2$ dB).

In one example of the covered sphere area, assume that there is a signal strength threshold for establishing a stable channel for the phone to communicate with other device. The covered sphere area is the region where a beam can boost the antenna gain above the threshold. The greedy algorithm selects the beam which enlarges the covered area at most.

In one embodiment, the sweeping is divided into multiple stages (i.e. hierarchical manner), each stage with a narrower step size e.g. in angular domain than the previous stage. This is different from the previous scheme since the signal measurement and reporting is needed between stages. The advantage of this scheme is that not all the beams are required to be swept. In this method, the first round of sweeping uses the largest step size. After finding the best beam in previous stage, the next stage sweeping will focus on the region close to the selected beam in the previous stage.

For example, if there are 9 beams in the horizontal plane, the 9 beams are numbered according to their main lobe direction from left to right (1, 2, . . . , 9). First, the sequence 2, 5, 8 is sweep. Then the best beam inside this set is identified. For example, beam 2 is the best one. After then, the adjacent beams of beam 2 are sweep, i.e., 1, 3. Then the best among the set {1, 2, 3} will be chosen for signal transmission/reception. Only 5 of the 9 beams are swept in this beam sweeping process.

Figure 18:
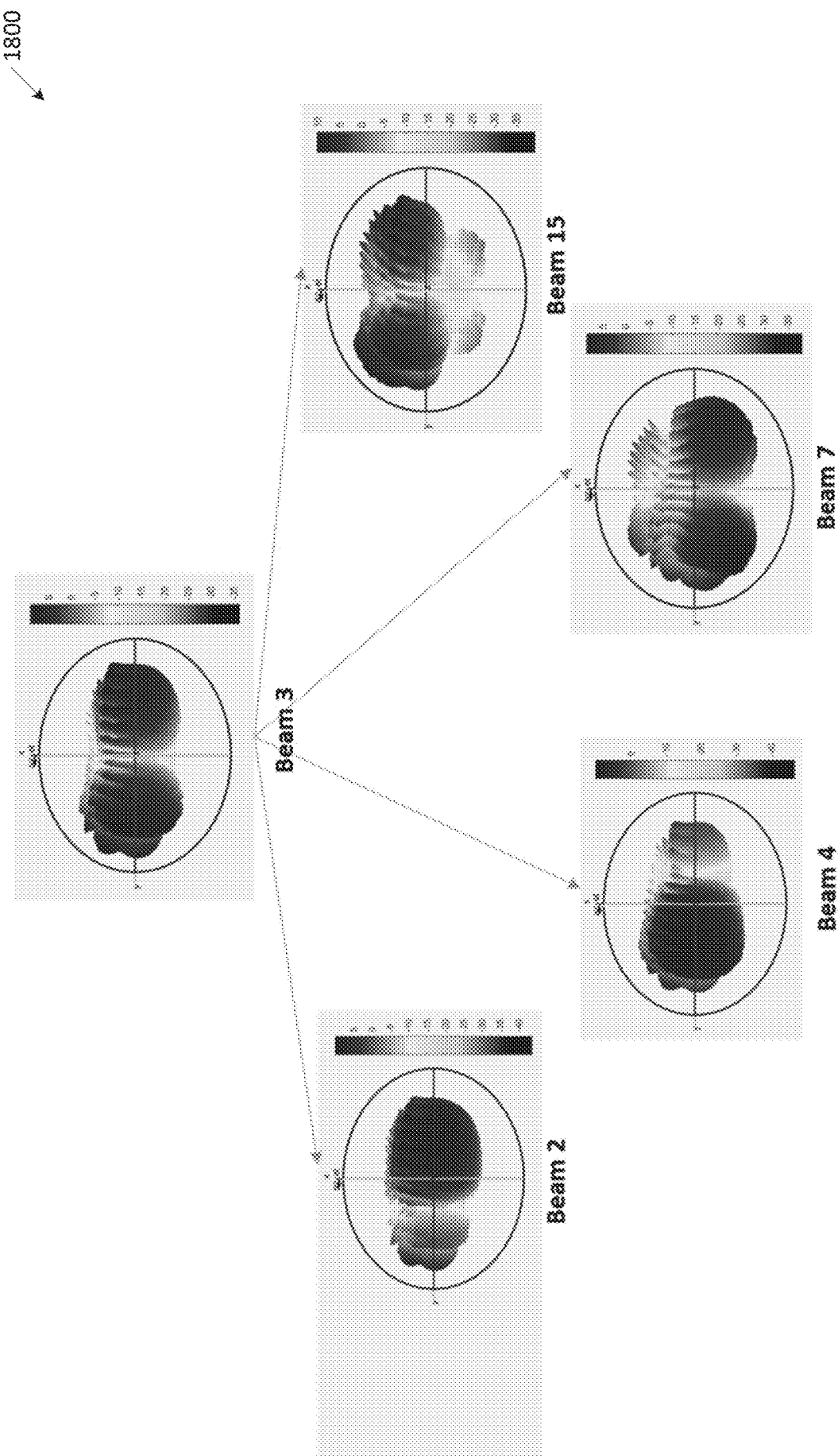
FIG. 18 illustrates an example radiation pattern of beam 3 according to embodiments of the present disclosure.

FIG. 18 illustrates an example radiation pattern 1800 of beam 3 and its close by beams 2, 4, 7, 15 according to embodiments of the present disclosure. The embodiment of the radiation pattern 1800 illustrated in FIG. 18 is for illustration only. FIG. 18 does not limit the scope of this disclosure to any particular implementation.

For the 16-beam example, the sweeping can also be split into two stages. The UE is scheduled to first sweep beam {1, 3, 9, 11}. If beam 3, for example, is the best beam in this stage, then the UE will sweep beam {2, 4, 7, 15}, whose main lobes are close to those of beam 3, which can be clearly seen in FIG. 18. Similarly, beam {2, 4, 5, 13} may be swept in the second stage if beam 1 is selected in the first stage.

In one embodiment, the sweeping sequence may depend on the UE-specific conditions including: the activity of the users (for example, watching video, playing games, calling, messaging.) The user activity may affect the latency requirements and the choice of beam sweeping algorithms. For example, when playing online games, the latency has a higher priority and a fast sweeping algorithm, which may not find the best beam direction, is favored; UE-orientation (for example, portrait or landscape mode, and the inclination angle of the phone (e.g., 45 degrees, 90 degrees)). The heuristic/greedy algorithm can be used to find the sweeping sequences for different UE orientations; and a UE blockage condition (for example, one or more antenna arrays are blocked by the hands/body). For example, if the antenna module is blocked by hand/body, the dominating region of the beam from the blocked module would diminish due to the absorption and reflection; and channel environment (for example, indoor/outdoor/in-car, urban/suburban/rural). For example, in the outdoor area, the beams pointing the base stations may be swept first while for the indoor area where the line-of-sight path may be blocked, the beams pointing the reflection paths may be swept first.

It may provide one example where the beam sweeping depends on the UE orientation. The UE can be rotated when in use, for example, changing from portrait orientation to landscape orientation when watching video. A beam that works well in the portrait mode may not work well in the landscape mode. Thus, there may be a need to have two different beam sweeping sequences for the portrait and landscape mode, respectively.

Figure 19:
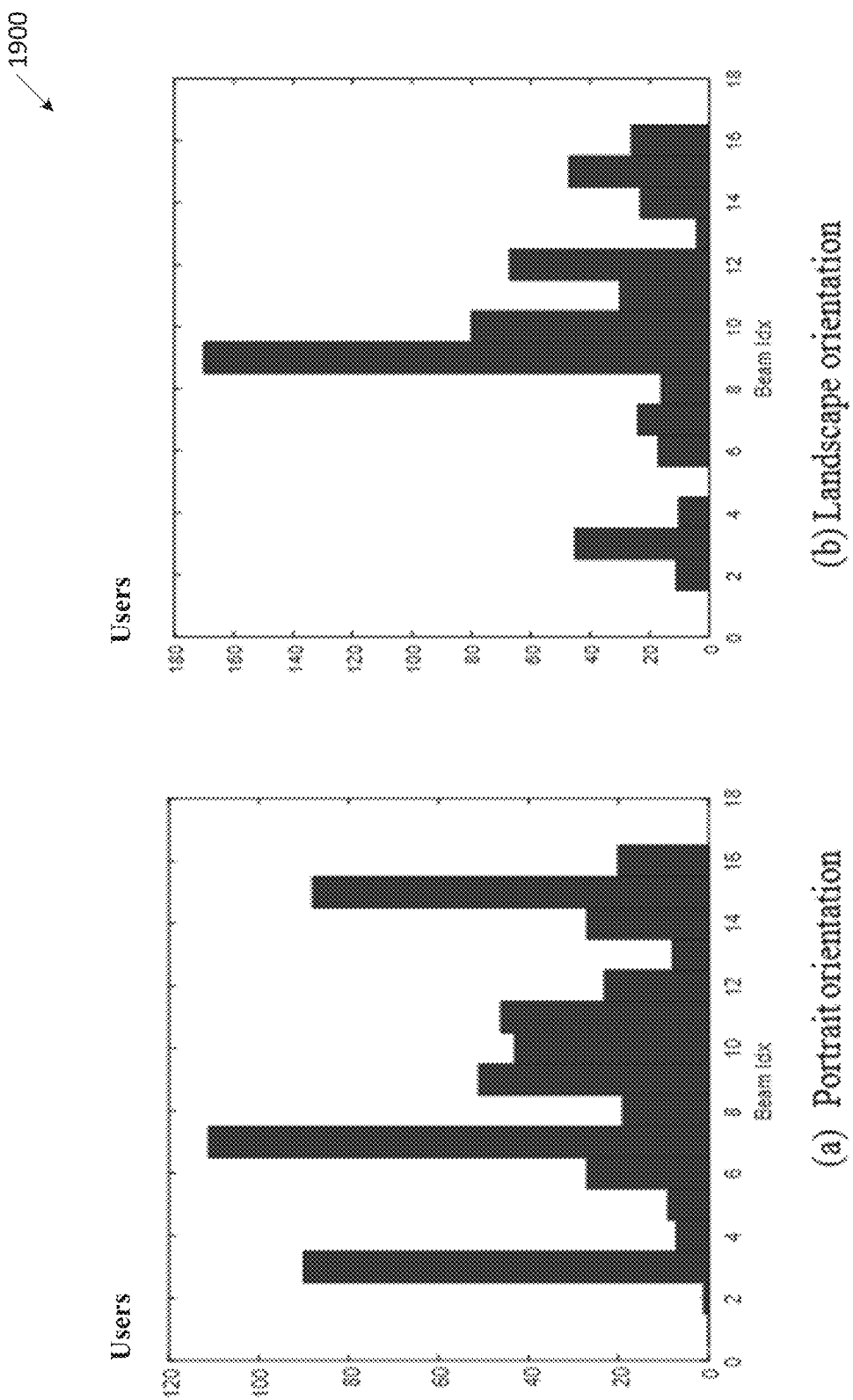
FIG. 19 illustrates an example distribution of the selected beam in portrait and landscape orientations according to embodiments of the present disclosure.

FIG. 19 illustrates an example distribution of the selected beam 1900 in portrait and landscape orientations according to embodiments of the present disclosure. The embodiment of the distribution of the selected beam 1900 illustrated in FIG. 19 is for illustration only. FIG. 19 does not limit the scope of this disclosure to any particular implementation.

As illustrated in FIG. 19, the occurrence frequencies of the beams are shown in the portrait and landscape orientation from a system level simulation with a total of 570 users. The occurrence frequencies are very different, which justifies the usage of different sweeping orders in these two orientations. The provided sweeping sequence basically follows the order of the occurrence frequency, i.e., beam 7, 3, 15 may be swept first in the portrait mode while beam 9, 10, 12 may be swept first in the landscape mode. The orientation of the UE may be measured or determined by the sensors in smart phones, for example, magnetometer and gyroscope. An exemplary flow chart of beam sweeping update based on UE orientation is given in.

In another embodiment, there is a beam codebook comprising a large number of codewords (called baseline codebook) and the UE is equipped with a unit which determines the subset of codewords (called refined codebook) for the UE based on one or more of the following inputs: baseline beam codebook or equivalently the beam patterns corresponding the baseline beam codebook; target performance metric for beam codebook refinement; and a UE-specific condition, such as the UE orientation, and/or channel environment.

Figure 20:
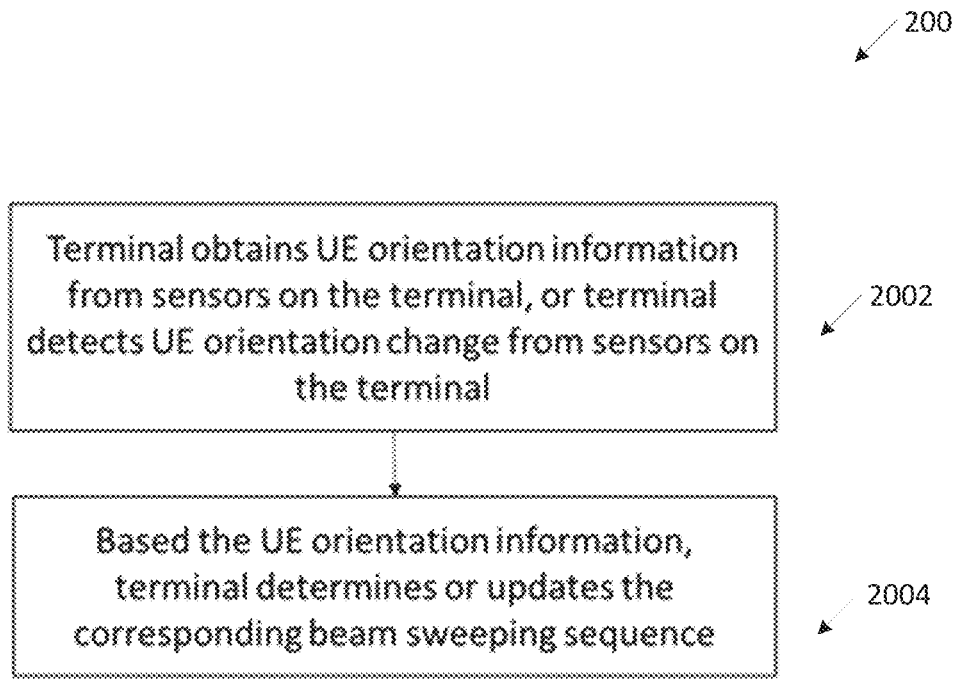
FIG. 20 illustrates a flow chart of a method for a beam sweeping determination or update based on UE orientation on terminal according to embodiments of the present disclosure.

FIG. 20 illustrates a flow chart of a method 2000 for a beam sweeping determination or update based on UE orientation on terminal according to embodiments of the present disclosure, as may be performed by a UE (e.g., terminal). The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the terminal obtains UE orientation information from sensors on the terminal, or the terminal detects UE orientation change from sensors on the terminal. In step 2004, based on the UE orientation information, the terminal determines or updates the corresponding beam sweeping sequence.

Figure 21:
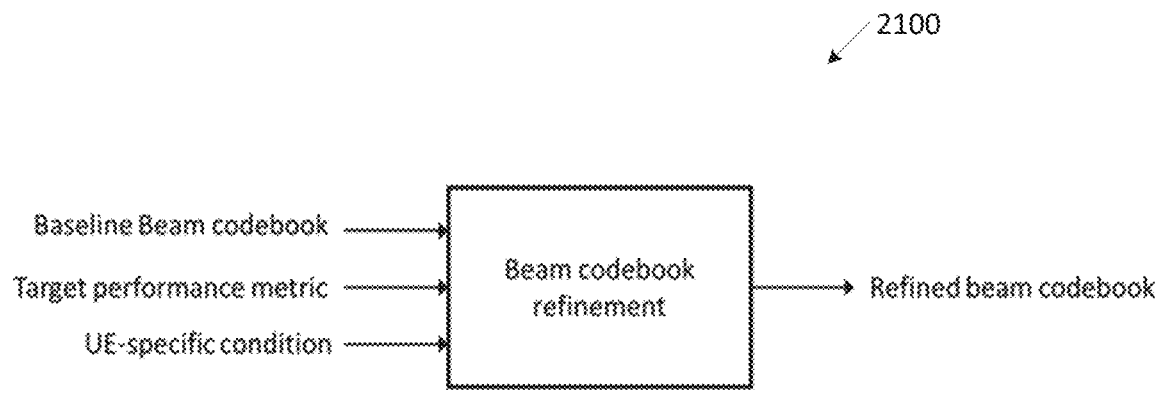
FIG. 21 illustrates an example beam codebook refinement circuit according to embodiments of the present disclosure.

FIG. 21 illustrates an example beam codebook refinement circuit 2100 according to embodiments of the present disclosure. The embodiment of the beam codebook refinement circuit 2100 illustrated in FIG. 21 is for illustration only. FIG. 21 does not limit the scope of this disclosure to any particular implementation.

As illustrated in FIG. 21, the circuit also enables the UE to update the best refined beam codebook if there is a change to the inputs. If some of the inputs above are deterministic (not changing over time) e.g. the baseline beam codebook or the target performance metric, then can be built in the unit and need not be an input to the unit. The UE-specific condition as an input is optional and need not be applied if dependency on UE-specific condition is not desired to reduce implementation complexity.

Schemes for determining the optimal beam sweeping order can be applied to determine the refined beam codebook. In particular, for a baseline beam codebook of size P, and a refined beam codebook of size Q, the codewords for the refined beam codebook can be determined by the first Q beams in the beam sweeping order produced by the schemes described.

A 5G terminal or a UE can be equipped with multiple radio front-end (RF) modules where each module has an antenna array based on the architecture as illustrated in FIG. 9. Certain architecture may also allow an RF module to have more than one antenna array. Each RF module is capable of generating RF beams with phase shifters, or with phase shifters as well as amplitude weights.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   at least one processor configured to:
   identify a radiation pattern of each beam in a set of beams to be used for communicating with a base station (BS);
   identify a database including a beam index of each beam in the set of beams;
   identify a beam sweeping sequence based on at least one of the database, the radiation pattern of each beam, or a UE-specific condition and based on a target performance metric or; and
   sweep each beam in the set of beams based on the beam sweeping sequence to radiate signal power of each beam through a transceiver that is operably connected to the at least one processor.

2. The UE of claim 1, wherein the processor is further configured to identify the beam sweeping sequence based on an area of dominating region of each beam in the set of beams and a gain of each beam in proportion to a size of the area of dominating region of each beam.

3. The UE of claim 2, wherein the beam sweeping sequence is determined based on a decreasing order of the area of dominating region of each beam in the set of beams.

4. The UE of claim 1, wherein the processor is further configured to identify the beam sweeping sequence using a greedy algorithm sequentially selecting each beam in the set of beams based on a criteria comprising at least one of a mean equivalent isotopically radiated power (EIRP), a percentile EIRP, or multiple EIRPs.

5. The UE of claim 1, wherein the processor is further configured to:
identify at least one group of beams based on a direction of a main lobe of the set of beams;
select, from the at least one group of beams, a beam including higher quality than other beams in the at least one group of beams; and
identify the beam sweeping sequence including the selected beam and adjacent beams of the selected beam; and
transmit, to the BS, a signal measurement report for the at least one group of beams.

6. The UE of claim 1, wherein the UE-specific condition comprises at least one of an activity of user, an orientation of the UE, a UE blockage condition by a user, or a channel environment.

7. The UE of claim 1, wherein the processor is further configured to identify the beam sweeping sequence based on a beam codebook.

8. A method of a user equipment (UE) in a wireless communication system, the method comprising:
identifying a radiation pattern of each beam in a set of beams to be used for communicating with a base station (BS);
identifying a database including a beam index of each beam in the set of beams;
identifying a beam sweeping sequence based on at least one of the database, the radiation pattern of each beam, or a UE-specific condition and based on a target performance metric; and
sweeping each beam in the set of beams based on the beam sweeping sequence to radiate signal power of each beam through a transceiver.

9. The method of claim 8, further comprising identifying the beam sweeping sequence based on an area of dominating region of each beam in the set of beams and a gain of each beam in proportion to a size of the area of dominating region of each beam.

10. The method of claim 9, wherein the beam sweeping sequence is determined based on a decreasing order of the area of dominating region of each beam in the set of beams.

11. The method of claim 8, further comprising identifying the beam sweeping sequence using a greedy algorithm sequentially selecting each beam in the set of beams based on a criteria comprising at least one of a mean equivalent isotopically radiated power (EIRP), a percentile EIRP, or multiple EIRPs.

12. The method of claim 8, further comprising:
identifying at least one group of beams based on a direction of a main lobe of the set of beams;
selecting, from the at least one group of beams, a beam including higher quality than other beams in the at least one group of beams;
identifying the beam sweeping sequence including the selected beam and adjacent beams of the selected beam; and
transmitting, to the BS, a signal measurement report for the at least one group of beams.

13. The method of claim 8, wherein the UE-specific condition comprises at least one of an activity of user, an orientation of the UE, a UE blockage condition by a user, or a channel environment.

14. The method of claim 8, further comprising identifying the beam sweeping sequence based on a beam codebook.

15. A non-transitory computer readable medium comprising instructions, that when executed by at least one processor of a user equipment (UE), cause the UE to:
identify a radiation pattern of each beam in a set of beams to be used for communicating with a base station (BS);
identify a database including a beam index of each beam in the set of beams;
identify a beam sweeping sequence based on at least one of the database, the radiation pattern of each beam, or a UE-specific condition and based on a target performance metric; and
sweep each beam in the set of beams based on the beam sweeping sequence to radiate signal power of each beam through a transceiver.

16. The non-transitory computer readable medium of claim 15, further comprising instructions, that when executed by the at least one processor, cause the UE to:
identify the beam sweeping sequence based on a beam codebook to be used; and
identify the beam sweeping sequence based on an area of dominating region of each beam in the set of beams and a gain of each beam in proportion to a size of the area of dominating region of each beam.

17. The non-transitory computer readable medium of claim 16, wherein the beam sweeping sequence is determined based on a decreasing order of the area of dominating region of each beam in the set of beams.

18. The non-transitory computer readable medium of claim 15, further comprising instructions, that when executed by the at least one processor, cause the UE to identify the beam sweeping sequence using a greedy algorithm sequentially selecting each beam in the set of beams based on a criteria comprising at least one of a mean equivalent isotopically radiated power (EIRP), a percentile EIRP, or multiple EIRPs.

19. The non-transitory computer readable medium of claim 15, further comprising instructions, that when executed by the at least one processor, cause the UE to:
identify at least one group of beams based on a direction of a main lobe of the set of beams;
select, from the at least one group of beams, a beam including higher quality than other beams in the at least one group of beams;
identify the beam sweeping sequence including the selected beam and adjacent beams of the selected beam; and
transmit, to the BS, a signal measurement report for the at least one group of beams.

20. The non-transitory computer readable medium of claim 15, wherein the UE-specific condition comprises at least one of an activity of user, an orientation of the UE, a UE blockage condition by a user, or a channel environment.

* * * * *